US006859273B2

(12) United States Patent
Foster et al.

(10) Patent No.: US 6,859,273 B2
(45) Date of Patent: Feb. 22, 2005

(54) METHOD FOR OPERATING A LASER SCANNING CONFOCAL MICROSCOPE SYSTEM AND A SYSTEM THEREOF

(75) Inventors: Thomas H. Foster, Rochester, NY (US); David L. Conover, Rochester, NY (US); Chad E. Biglow, Rochester, NY (US); Irene Georgakoudi, Action, MA (US); Andrey Mezhiba, Rochester, NY (US); Soumya Mitra, Rochester, NY (US)

(73) Assignee: University of Rochester, Rochester, NY (US)

( * ) Notice: Subject to any disclaimer, the term of this patent is extended or adjusted under 35 U.S.C. 154(b) by 140 days.

(21) Appl. No.: 10/202,213

(22) Filed: Jul. 23, 2002

(65) Prior Publication Data

US 2003/0052280 A1 Mar. 20, 2003

Related U.S. Application Data

(60) Provisional application No. 60/307,243, filed on Jul. 23, 2001.

(51) Int. Cl.$^7$ .............................................. G01N 21/64
(52) U.S. Cl. .................................... 356/318; 250/458.1
(58) Field of Search ............................... 356/317, 318, 356/417; 250/458.1, 459.1, 461.1, 461.2

(56) References Cited

U.S. PATENT DOCUMENTS

| | | | |
|---|---|---|---|
| 4,972,258 A | 11/1990 | Wolf et al. | |
| 5,084,612 A | 1/1992 | Iwasaki et al. | |
| 5,200,838 A | 4/1993 | Nudelman et al. | |
| 5,296,703 A | 3/1994 | Tsien | |
| 6,040,567 A | 3/2000 | Neher et al. | |
| 6,341,035 B1 | 1/2002 | Miura et al. | |
| 6,355,919 B1 | 3/2002 | Engelhardt | |
| 6,388,807 B1 | 5/2002 | Knebel et al. | |
| 6,588,900 B1 * | 7/2003 | Le Gargasson et al. | .... 351/200 |
| 2001/0052976 A1 | 12/2001 | Juncosa et al. | |
| 2001/0053018 A1 | 12/2001 | Engelhardt | |
| 2002/0027202 A1 | 3/2002 | Engelhardt et al. | |

FOREIGN PATENT DOCUMENTS

| | | |
|---|---|---|
| EP | 1 115 021 | 7/2001 |
| WO | WO 00/31576 | 6/2000 |
| WO | WO 00/59368 | * 10/2000 |

* cited by examiner

Primary Examiner—F. L. Evans
(74) Attorney, Agent, or Firm—Blank Rome LLP

(57) ABSTRACT

A method for operating a confocal microscope system includes deflecting a light beam on a specimen with at least one beam deflection device. The position of the light beam is stepped with at least one beam deflection device across the specimen. A sample of emitted fluorescent light from the specimen is captured in synchronization with each of the stepped positions of the light beam. An image is obtained from the captured samples of emitted fluorescent light.

12 Claims, 4 Drawing Sheets

METHOD FOR OPERATING A LASER SCANNING CONFOCAL MICROSCOPE SYSTEM AND A SYSTEM THEREOF

This application claims the benefit of U.S. Provisional Patent Application Ser. No. 60/307,243 filed Jul. 23, 2001 which is hereby incorporated by reference in its entirety.

This invention was developed with government funding under National Institute of Health Grant No. CA68409. The U.S. Government may have certain rights.

FIELD OF THE INVENTION

This invention relates to a method for operating a confocal microscope system and a system thereof.

BACKGROUND OF THE INVENTION

Laser scanning confocal microscopes have the ability to penetrate beneath the surface of a specimen to obtain slices of imaging data. These slices or sections can be taken at specific depths in the specimen and then can be recombined to form a three dimensional image of the examined section. In order to be viewed by the laser scanning confocal microscope, the section of the specimen being examined must be auto-fluorescent or be stained with fluorescent dyes.

Unfortunately, control of laser scanning confocal microscopes has been fairly difficult and rigid. As a result, an operator of a laser scanning confocal microscope must spend a great deal of time and effort to modify the operation of a laser scanning confocal microscope for particular application. Additionally, there have been some deficiencies in controlling the timing of different operations within the laser scanning confocal microscope.

SUMMARY OF THE INVENTION

A method for operating a confocal microscope system in accordance with embodiments of the present invention includes deflecting a light beam on a specimen with at least one beam deflection device. The position of the light beam is stepped with at least one beam deflection device across the specimen. A sample of emitted fluorescent light from the specimen is captured in synchronization with each of the stepped positions of the light beam. An image is obtained from the captured samples of emitted fluorescent light.

A confocal microscope system in accordance with embodiments of the present invention includes one or more beam deflection devices, a positioning system, a detector, a synchronization system, and an imaging system. The one or more beam deflection devices are positioned to deflect a light beam on a specimen. The positioning system connected to each of the beam deflection devices step the position of the light beam with the one or more beam deflection devices across the specimen. The detector is positioned to capture one or more samples of emitted fluorescent light from the specimen. The synchronization system synchronizes the capture of each of the one or more samples with each of the stepped positions of the light beam. The imaging system obtains an image from the captured samples of the emitted fluorescent light.

The present invention provides a method and system for simple and flexible control of a laser scanning confocal microscope. More specifically, the present invention provides simple and effective controls over aspects of the laser scanning confocal microscope system, such as the front panel user interface, the synchronization of beam deflection device movement and photomultiplier tube data acquisition, as well the display, processing, and storage of images. With the present invention, control of the laser scanning confocal microscope can be readily and easily modified for specific applications and also for interfacing with other instruments.

DETAILED DESCRIPTION

Figure 1:
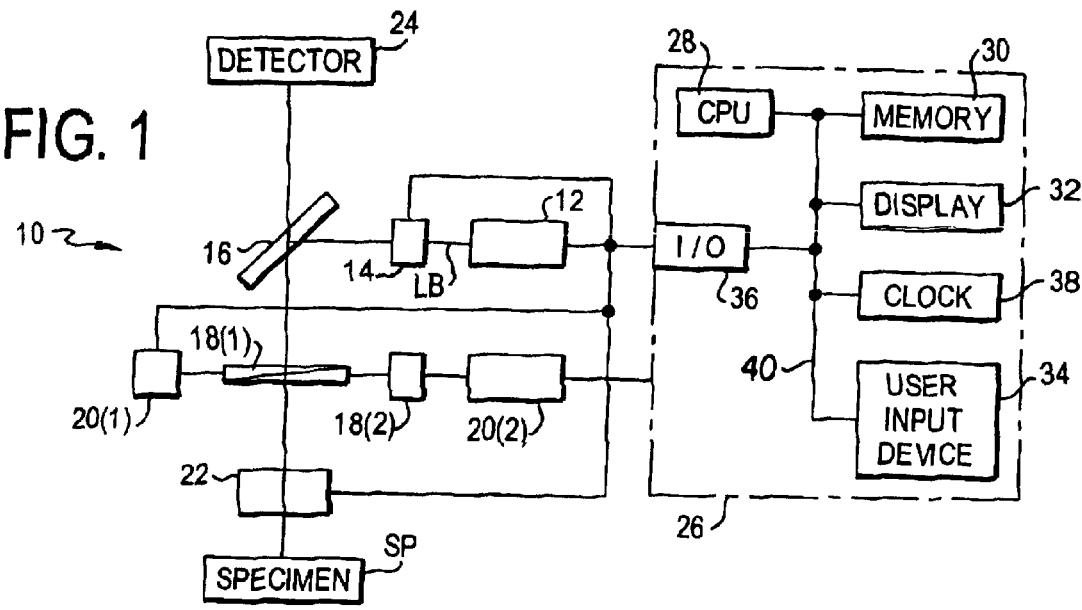
FIG. 1 is a block diagram of a confocal microscope system in accordance with embodiments of the present invention.

A system and method for operating a laser scanning confocal microscope system 10 in accordance with embodiments of the present invention is illustrated in FIGS. 1 and 2A–2C. The system 10 includes a laser source 12, a shutter 14, a beam splitter 16, mirrors 18(1) and 18(2), stepper motor systems 20(1) and 20(2) 20(1) and 20(2), an objective lens system 22, a photomultiplier tube 24, and scanning control system 26 although other types and number of components could be used. The present invention provides a number of advantages including providing simple and flexible control of a laser scanning confocal microscope 10.

Referring to FIG. 1, the laser source 12 generates a laser beam LB which is used in scanning a specimen SP or other sample. The laser source 12 is coupled to the scanning control system 26 which controls operations of the laser source 12, such as when the laser source 12 is engaged to generate a light beam and the type of light beam generated by the laser source 12. Although the laser source 12 with the laser beam LB is shown, other types of light source systems generating other types of light beams could be used.

The shutter 14 is positioned in the path of the laser beam LB or other light. The shutter 14 has an open position that permits the laser beam LB to pass through and a closed position that blocks the laser beam LB from passing through, although the shutter 14 could have other positions, such as a partially open position. Scanning control system 26 is coupled to and controls operations of the shutter 14, such as the position of shutter 14.

The beam splitter 16 is used to reflect the laser beam LB from the laser source 12 towards the specimen SP being examined. In this particular embodiment, the beam splitter 16 is a dichroic mirror, although other types of beam splitters could be used.

Mirrors 18(1) and 18(2) and stepper motor systems 20(1) and 20(2) are used to deflect the laser beam LB to permit raster scanning of the specimen SP, although other types of beam deflection devices and beam deflection device positioning systems can be used. Mirror 18(1) is coupled to the stepper motor system 18(1) which is coupled to and controlled by the scanning control system 26 to move the laser beam LB along the X-axis. Mirror 18(2) is coupled to the stepper motor system 20(2) which is also coupled to and controlled by the scanning control system 26 to move the laser beam LB along the Y-axis. This controlled movement of the laser beam LB along the X-axis and the Y-axis can be used to generate a raster scan back and forth across a section of the specimen SP. Additionally, although two mirrors 18(1) and 18(2) and two stepper motor systems 20(1) and 20(2) are shown, other numbers of mirrors and other numbers of stepper motor systems could be used to deflect the laser beam LB along the X-axis and the Y-axis, such as a single beam deflection device and/or a single beam deflection device positioning system. Further, although in this particular embodiment the mirrors 18(1) and 18(2) are stepped, other manners of moving the mirrors 18(1) and 18(2), such as with a continuous motion or by oscillation, can also be used.

The objective lens system 22 is used to focus the laser beam LB to a desired depth for analyzing a section of the specimen SP. The objective lens system 22 can be adjusted so that the laser beam LB is focused at other depths in the specimen SP and to magnify light passing through the objective lens system 22. The objective lens system 22 is coupled to and controlled by the scanning control system 26. Although an objective lens system 22 is shown, other types of optical systems for focusing the laser beam LB to different depths in the specimen SP can also be used.

The photomultiplier tube 24 is used to capture samples, such as emitted fluorescent light from the section of the specimen SP being examined. The photomultiplier tube 24 is coupled to the scanning control system 26 which controls operations of the photomultiplier tube 24. Although a photomultiplier tube 24 is shown, other types of detection systems could also be used. Additionally, although one photomultiplier tube 24 is shown, other numbers of photomultiplier tubes and/or her detectors could be used to capture samples and samples in more than one color channels can be captured if color imaging is desired for a specific application.

The scanning control system 26 includes a central processing unit (CPU) or processor 28, a memory 30, a graphical user interface or display 32, a user input device 34, a input/output interface device 36, and a clock 38 which are coupled together by a bus system 40 or other link, respectively, although the system may comprise other components, other numbers of the components, and other combinations of the components.

Figure 2C:
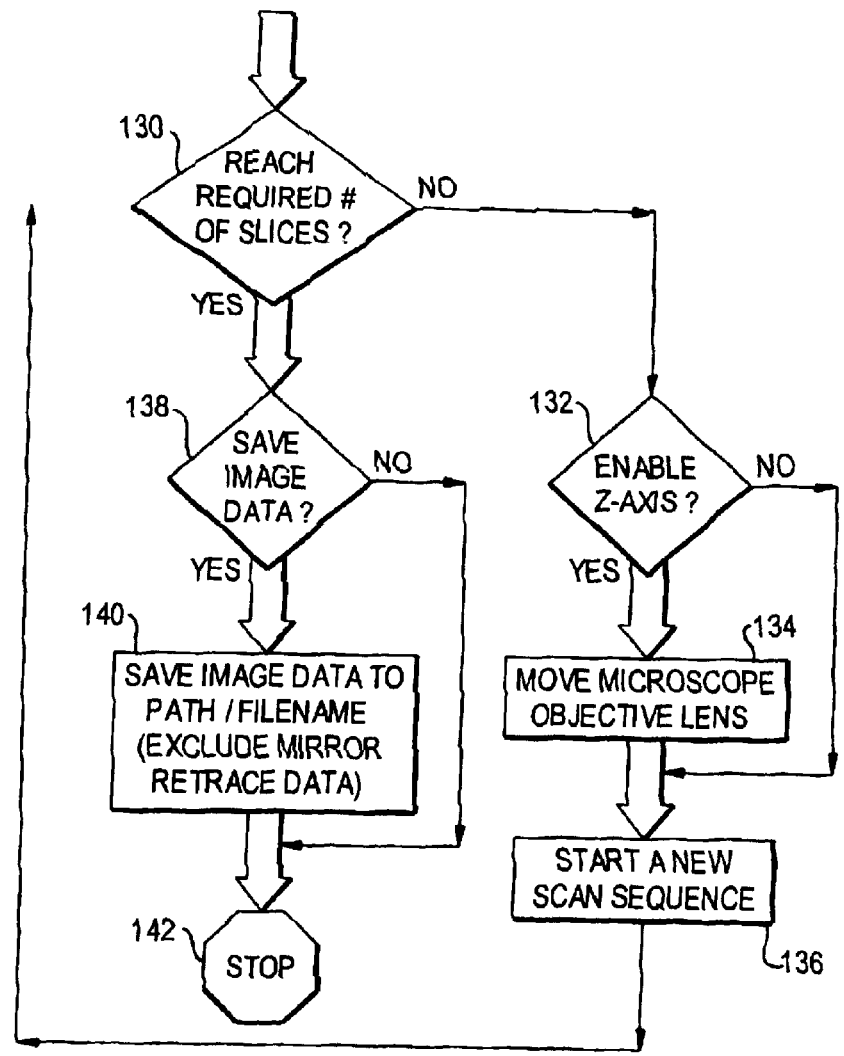
FIGS. 2A–2C show a flow chart of a method for operating a confocal microscope system in accordance with embodiments of the present invention.
Figure 2A:
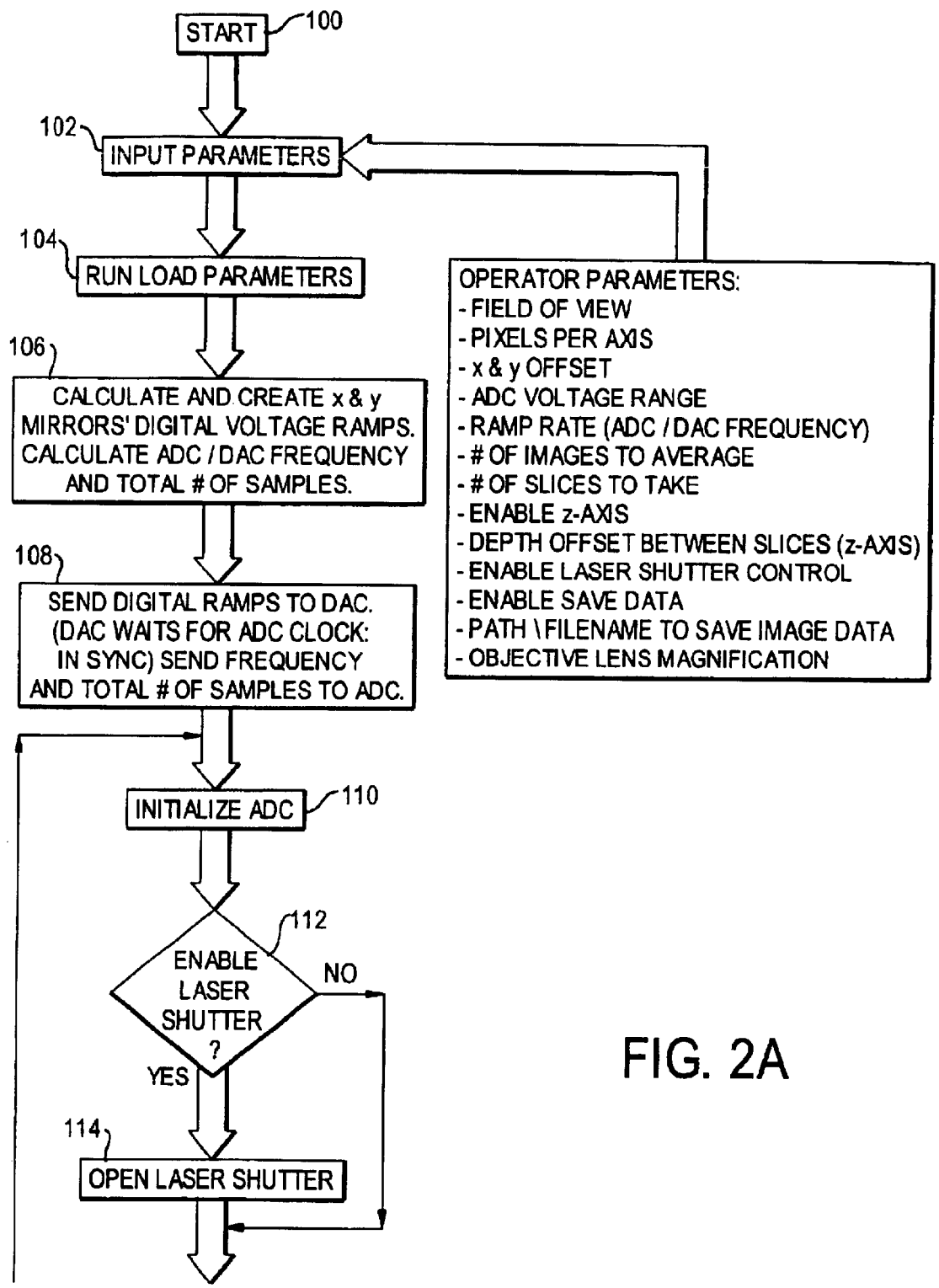
Figure 2B:
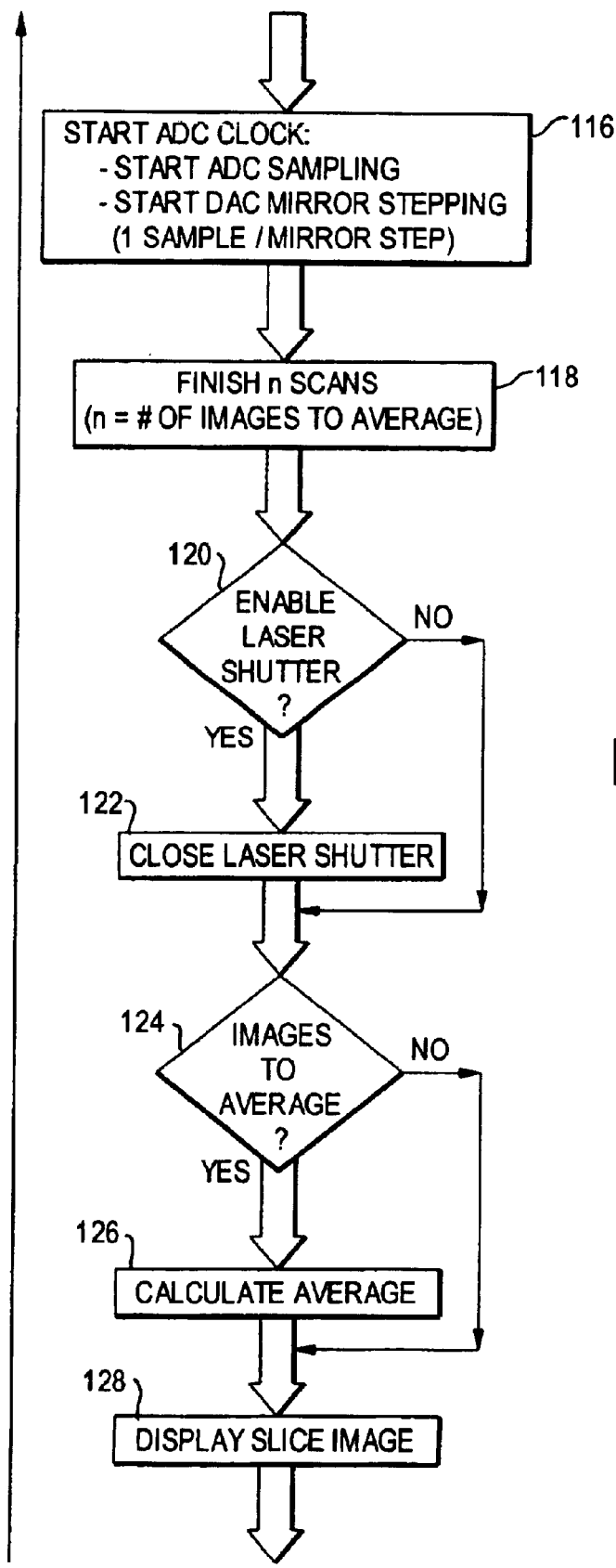

The processor 28 may execute one or more programs of stored instructions for the method for controlling a confocal microscope system 10 in accordance with one embodiment of the present invention as described herein and illustrated in FIGS. 2A–2C. In this particular embodiment, these programmed instructions are stored in memory 30 and are executed by processor 28, although some or all of those programmed instructions could be stored and retrieved from and also executed at other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 28, can be used for memory 30.

Figure 3:
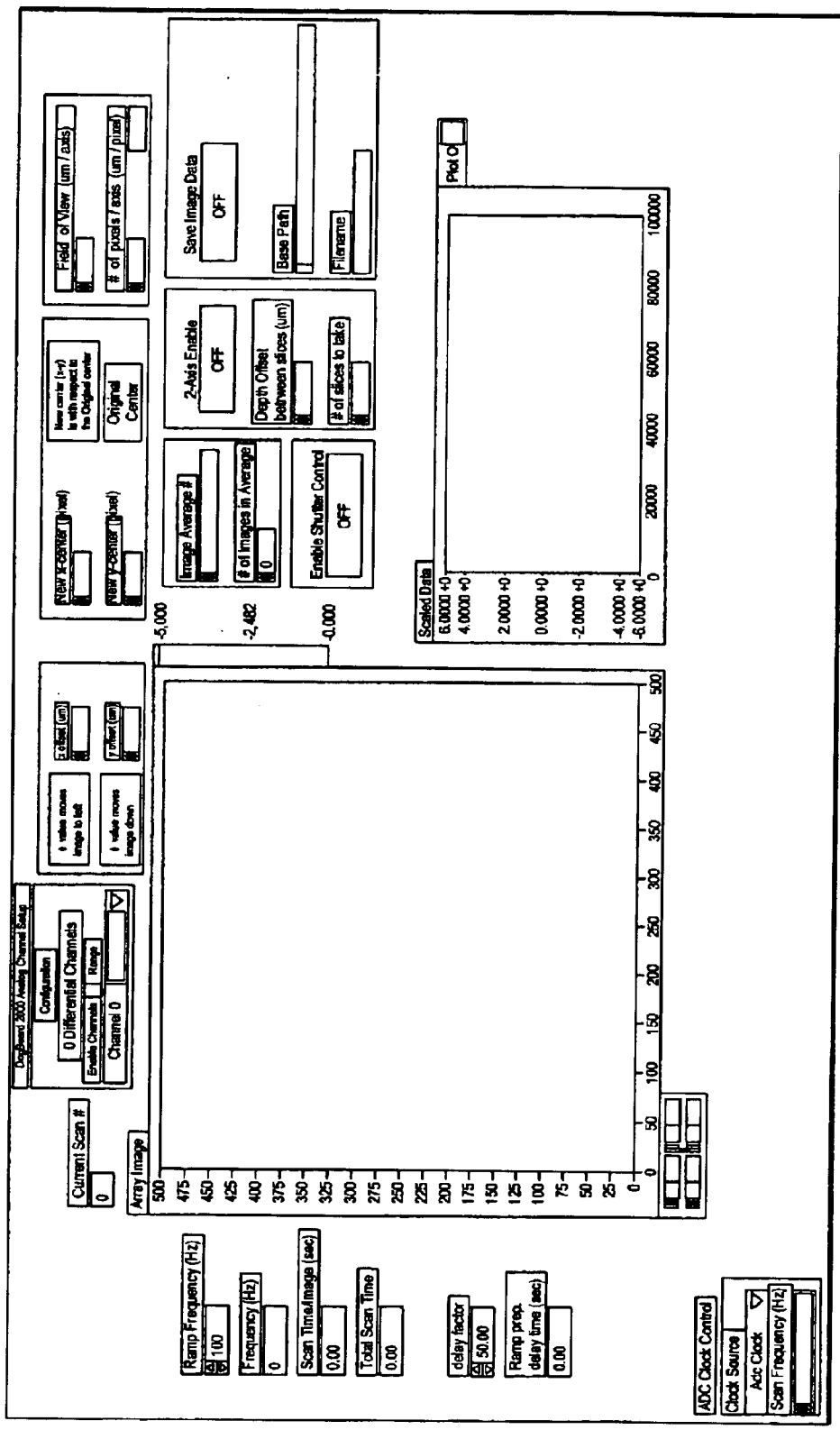
FIG. 3 is a screen shot of an example of a user interface panel on a display in the confocal microscope system.

The display is used to show information to the operator, such as a captured image of a section of the specimen SP or a screen shot of a front panel user interface for operating the system 10 as shown in FIG. 3. A variety of different of devices can be used for the graphical user interface or display 32, such as a CRT or flat panel display.

The user input device 34 permits an operator to enter data into the scanning control system 26. A variety of different types devices can be used for user input device 34, such as a keyboard, a computer mouse, or an interactive display screen.

The input/output interface device 36 is used to couple the scanning control system 26 to other components, including the laser source 12, the stepper motor systems 20(1) and 20(2), the objective lens system 22, and the photomultiplier tube 24. A variety of different interface devices can be used with a variety of different communication protocols.

The clock 38 is used to control and synchronize operations in the system 10, such as the synchronizing the stepping of the laser beam LB with the acquiring data from the specimen SP with each step.

The scanning control system 26 may also comprise a programmed computer system with a controller board, such as the Iotech 16-bit data acquisition board, Daqboard 2000. The instructions programmed in the scanning control system 26 for the method for controlling a confocal microscope system 10 are optimized for use with the controller board which is used to control operations of the confocal microscope. More specifically, in this particular embodiment the programmed instructions for the mirror motion (digital-to-analog conversion), photomultiplier tube voltage data acquisition (analog-to-digital conversion), image display and data storage for the confocal microscope system 10 are done in Labview, Graphical Programming for Instrumentation code. Programs written in Labview are called virtual instruments because their appearance and operation can imitate actual instruments. In this particular embodiment, the programmed virtual instruments includes an interactive user interface or front panel as shown in FIG. 3. The interactive user interface is shown on the display 32 and simulates a panel of a physical instrument with controls and indicators, such as knobs, push buttons, and graphs. The operator enters data into this interactive user interface using a user input device, such as a computer mouse and/or a keyboard. Other programmed virtual instrument in this particular embodiment include virtual instruments for an adjustment system for controlling the depth of the scan into the specimen SP along the Z-axis and for mirror voltage ramps for controlling the stepper motor systems 20(1) and 20(2) to step the positions of the mirrors 18(1) and 18(2) to move the laser beam LB along the X-axis and along the Y-axis. Virtual instruments for other tasks associated with the operation of the confocal microscope system 10 could also be programmed in, such as mirror warm-up, z-resolution analysis, independent data acquisition, setup control, image data retrieval and display with image processing capabilities, such as zoom, centering, sizing, transposing, coloring, and filtering depending on the particular application. Although one type of controller board and instructions programmed in Labview are shown in this particular embodiment, other types of components and other types of programming languages could be used.

Referring to FIGS. 1–3, a method for operating a laser scanning confocal microscope is described. In step 100, the method starts.

In step 102, an operator begins by inputting motion control and data acquisition parameters into the program for the specific application with the user input device, although some or all of the parameters can be obtained in other manners, such as being retrieved from memory 30 in the scanning control system 26. A variety of different parameters may be input, such as field of view, pixels per axis, X-axis and Y-axis offset, analog-to-digital voltage range, ramp rate, number of images to average, number of slices to take, enable Z-axis, depth offset between slices along the Z-axis, enable laser shutter control, enable save data, path/filename to save image data, and objective lens system magnification, depending on the specific application.

In step 104, after the parameters are input or otherwise obtained, the operator activates a "run button" using the user input device, although the scanning control system 26 could be activated or initiated with respect to this method in other manners, such as automatically. The input parameters are loaded into the scanning control system 26 for further processing.

In step 106, the input parameters are used by the scanning control system 26 to calculate mirror motion control and data acquisition variables, such as mirror ramp voltages for controlling the stepping movement of the mirrors 18(1) and 18(2) along the X-axis and the Y-axis which are substantially perpendicular to each other, the analog-to-digital frequency used for controlling the rate of stepping the mirrors 18(1) and 18(2) and for capturing samples with the photomultiplier tube 24, and the total number of samples needed for obtaining the desired image, although other variables could be calculated. In this particular embodiment, the mirror ramp voltages are generated to move the mirrors 18(1) and 18(2) with the stepper motor systems 20(1) and 20(2) in a manner that will cause a raster scan of the laser light on the specimen SP.

In step 108, the scanning control system 26 begins to process the calculated mirror motion control and data acquisition variables for operating the confocal microscope system 10, such as converting the digital ramp voltages used to control movement of the mirrors 18(1) and 18(2) to analog signals, synchronizing the control signals for the photomultiplier tube 24 with the clock 38 which is used in controlling the operation of the stepper motor systems 20(1) and 20(2) with the photomultiplier tube 24, and setting the total number of captured samples needed. In step 110, once the variables are processed, the scanning control system 26 may initialize operations, such as initializing the clock 38.

In step 112, a determination is made by the scanning control system 26 on whether to enable the shutter 14. If the shutter 14 is already in an open position, then the shutter 14 is not enabled by the scanning control system 26 and the No branch is taken to step 116. If the shutter 14 is closed, then the shutter 14 is enabled in step 112 and the Yes branch is taken to step 114. In step 114, shutter 14 is moved to an open position by the scanning control system 26 which allows the laser beam LB to pass by the shutter 14 to the beam splitter 16. The beam splitter 16 directs the laser beam LB on to the mirrors 18(1) and 18(2). The mirrors 18(1) and 18(2) direct the laser beam LB to an objective lens system 22 which focuses the laser beam LB on the specimen SP.

Next in step 116, the scanning control system 26 starts the clock 38, the stepping of the mirrors 18(1) and 18(2), and the capturing of samples by the photomultiplier tube 24. More specifically, the stepper motor systems 20(1) and 20(2) with control signals from the scanning control system 26, move the mirrors 18(1) and 18(2) through steps to deflect the laser beam LB in a way that turns the laser beam LB into a scanning beam on desired locations of the specimen SP. The objective lens system 22 is controlled by the scanning control system 26 to control the particular depth of focus for the laser beam LB from the mirrors 18(1) and 18(2). A mixture of reflected light and emitted fluorescent light from the specimen SP is captured by the same objective lens system 22 and is focused onto the photomultiplier tube 24 via the beam splitter 16. The reflected light is deviated by the beam splitter 16 while the emitted fluorescent light passes through and samples of it are captured by the photomultiplier tube 24. The scanning control system 26 synchronizes the capture of samples by the photomultiplier tube 24 with each of the stepped positions of the mirrors 18(1) and 18(2). Samples of emitted fluorescent light can be captured in more than one color channel and the scanning control system 26 can generate color images from this captured data in more than one color channel.

In step 118, the scanning control system 26 controls the system to perform n raster scans for each image slice (n=the number of images to average) which need to be obtained for the particular application.

In step 120, a determination is made by the scanning control system 26 on whether to enable the shutter 14. If the shutter 14 can remain in an open position, then the shutter 14 is not enabled by the scanning control system 26 and the No branch is taken to step 124. If the shutter 14 needs to be in the closed position, then the shutter 14 is enabled in step 120 and the Yes branch is taken to step 122. In step 122, the shutter 14 is moved to a closed position which prevents the laser beam LB from passing by the shutter 14.

In step 124, a determination is made by the scanning control system 26 on whether to average the images captured by the photomultiplier tube 24. If an average is not desired by the scanning control system 26, then the No branch is taken to step 128. If an average is desired by the scanning control system 26, then the Yes branch is taken from step 124 to step 126. In step 126, the scanning control system 26 calculates an average for the images captured by the photomultiplier tube 24. Scanning control system 26 may also perform a variety of mathematical operations on the obtained image acquired from one or more color channels, such as ratios, differences, sums, filters, and/or interpolations. Scanning control system 26 may also select a region of interest in the obtained image from which confocal spectra is acquired.

In step 128, the obtained image is shown on the display 32. A variety of operations can be performed by the scanning control system 26 on the displayed image, such as adjusting a center of a field of view of the obtained image or varying a field of view of the obtained image.

In step 130, a determination is made by the scanning control system 26 on whether the required number of slices of the image have been obtained. If the required number of slices of the image have not been obtained, then the No branch is taken to step 132.

In step 132, a determination is made by the scanning control system 26 on whether to enable the microscope objective lens system 22. If the microscope objective lens system 22 is not enabled, then the No branch is taken to step 136. If the microscope objective lens system 22 is enabled, then the Yes branch is taken to step 134. In step 134, the microscope objective lens system 22 is controlled by the scanning control system 26 to adjust the focus of the laser beam LB to a different depth in the specimen SP along the Z-axis to obtain another "slice" image. In step 136, a new scan sequence at the new depth is started and the method returns to step 110 as described earlier.

In step 130, if the required number of slices of the image have been obtained, then the Yes branch is taken to step 138. In step 138, a determination is made by the scanning control system 26 on whether to save the image data to memory 30. If the image data is to be saved in step 138, then the Yes branch is taken to step 140 where the image data is saved to memory 30 and then in step 142 the method ends. If the image data is not to be saved in step 138, then the No branch is taken to step 142 where the method ends.

Accordingly, the present invention provides a method and system for simple and flexible control of a laser scanning confocal microscope, such as controlling the front panel user interface, the synchronization of beam deflection device movement and photomultiplier tube data acquisition, as well as image display, processing and data storage. Control parameters for the present invention can be readily modified for specific applications. Additionally, the present invention can be used to coordinate the acquisition of confocal images or spectra with other instruments, thereby linking the functioning of the confocal microscope to other laboratory functions by sending and/or receiving signals to and/or from these other instruments. For example, another instrument could control or effect the operation of a component or components in the confocal microscope system 10, such as the operation of the laser source 12, the mirrors 18(1) and 18(2) and stepper motor systems 20(1) and 20(2), the objective lens system 22, and/or the photomultiplier tube 24. The present invention can be used in a variety of different applications, such as obtaining high resolution images of cell structures showing the exact positions and relative concentrations of a fluorescing drug in the cell structures.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for operating a confocal microscope system, the method comprising:

deflecting a light beam on a specimen with at least one beam deflection device;

stepping a position of the light beam with at least one beam deflection device across the specimen;

capturing a sample of emitted fluorescent light from the specimen in synchronization with each of the stepped positions of the light beam;

obtaining an image from the captured samples of the emitted fluorescent light;

opening a shutter positioned in a path of the light beam to start a scan of the specimen with the light beam; and closing the shutter to stop the scan of the specimen with the light beam.

2. A method for operating a confocal microscope system, the method comprising:

deflecting a light beam on a specimen with at least one beam deflection device;

stepping a position of the light beam with at least one beam deflection device across the specimen;

capturing a sample of emitted fluorescent light from the specimen in synchronization with each of the stepped positions of the light beam; and obtaining an image from the captured samples of the emitted fluorescent light;

wherein the stepping the position of the light beam further comprises determining one or more motion control variables for the stepping of the light beam based on one or more parameters.

3. The method as set forth in claim 2 further comprising inputting at least one of the one or more parameters.

4. The method as set forth in claim 2 further comprising retrieving at least one of the one or more parameters from a memory.

5. A method for operating a confocal microscope system, the method comprising:

deflecting a light beam on a specimen with at least one beam deflection device;

stepping a position of the light beam with at least one beam deflection device across the specimen;

capturing a sample of emitted fluorescent light from the specimen in synchronization with each of the stepped positions of the light beam;

obtaining an image from the captured samples of the emitted fluorescent light; and determining a number of the captured samples of the emitted fluorescent lights to take, wherein the capturing a sample of emitted fluorescent light from the specimen in synchronization with each of the stepped positions of the light beam stops when the determined number of the captured samples is reached.

6. A method for operating a confocal microscope system, the method comprising:

deflecting a light beam on a specimen with at least one beam deflection device;

stepping a position of the light beam with at least one beam deflection device across the specimen;

capturing a sample of emitted fluorescent light from the specimen in synchronization with each of the stepped positions of the light beam; and obtaining an image from the captured samples of the emitted fluorescent light;

wherein the capturing a sample of emitted fluorescent light from the specimen further comprises capturing samples of emitted fluorescent light in more than one color channel and wherein the obtaining an image further comprises obtaining a color image from the captured samples of emitted fluorescent light in the more than one color channel.

7. system for operating a confocal microscope system, the system comprising:

one or more beam deflection devices positioned to deflect a light beam on a specimen;

a positioning system connected to each of the beam deflection devices, the positioning system stepping a position of the light beam with the one or more beam deflection devices across the specimen;

a detector positioned to capture one or more samples of emitted fluorescent light from the specimen;

a synchronization system synchronizing the capture of each of the one or more samples with each of the stepped positions of the light beam;

an imaging system for obtaining an image from the captured samples of the emitted fluorescent light; and a shutter positioned in a path of the light beam, the shutter having at least in open position and a closed position.

8. system for operating a confocal microsope system, the system comprising:

one or more beam deflection devices positioned to deflect a light beam on a specimen;

a positioning system connected to each of the beam deflection devices, the positioning system stepping a position of the light beam with the one or more beam deflection devices across the specimen;

a detector positioned to capture one or more samples of emitted fluorescent light from the specimen;

a synchronization system synchronizing the capture of each of the one or more samples with each of the stepped positions of the light beam;

an imagine system for obtaining an image from the captured samples of the emitted fluorescent light; and a motion processing system that determines one or more motion control variables for the stepping of the light beam based on one or more parameters.

9. The system as set forth in claim 8 further comprising inputting at least one of the one or more parameters.

10. The system as set forth in claim 8 further comprising retrieving at least one of the one or more parameters from a memory.

11. system for operating a confocal microscope system, the system comprising:

one or more beam deflection devices positioned to deflect a light beam on a specimen;

a positioning system connected to each of the beam deflection devices, the positioning system stepping a position of the light beam with the one or more beam deflection devices across the specimen;

a detector positioned to capture one or more samples of emitted fluorescent light from the specimen;

a synchronization system synchronizing the capture of each of the one or more samples with each of the stepped positions of the light beam;

an imaging system for obtaining an image from the captured samples of the emitted fluorescent light; and a count processing system that determines a number of the captured samples of the emitted fluorescent lights to take, wherein the detector stops capturing samples of emitted fluorescent light when the determined number is reached.

12. system for operating a confocal microsope system, the system comprising:

one or more beam deflection devices positioned to deflect a light beam on a specimen;

a positioning system connected to each of the beam deflection devices, the positioning system stepping a position of the light beam with the one or more beam deflection devices across the specimen;

a detector positioned to capture one or more samples of emitted fluorescent light from the specimen;

a synchronization system synchronizing the capture of each of the one or more samples with each of the stepped positions of the light beam; and an imaging system for obtaining an image from the captured samples of the emitted fluorescent light;

wherein the detector captures samples of emitted fluorescent light in more than one color channel and wherein imaging system generates a color image from the captured samples of emitted fluorescent light the more than one color channel.

* * * * *